United States Patent
Messmer et al.

(10) Patent No.: US 6,857,037 B2
(45) Date of Patent: Feb. 15, 2005

(54) EXTENSION FOR THE ADVANCED MICROCONTROLLER BUS ARCHITECTURE (AMBA)

(75) Inventors: Adrian Messmer, Zurich (CH); Stefan Koch, Zurich (CH)

(73) Assignee: Koninklijke Philips Electronics N.V., Eindhoven (NL)

(*) Notice: Subject to any disclaimer, the term of this patent is extended or adjusted under 35 U.S.C. 154(b) by 514 days.

(21) Appl. No.: 10/022,380

(22) Filed: Nov. 30, 2001

(65) Prior Publication Data

US 2002/0162043 A1 Oct. 31, 2002

(30) Foreign Application Priority Data

Oct. 31, 2000 (EP) .............................. 00123692

(51) Int. Cl.[7] .............................................. G06F 13/00
(52) U.S. Cl. .................... 710/300; 713/320; 713/401; 713/501
(58) Field of Search ................ 713/320, 401, 713/501; 710/300, 100, 305, 322

(56) References Cited

U.S. PATENT DOCUMENTS 5,499,346 A * 3/1996 Amini et al. ............... 710/311
5,748,806 A * 5/1998 Gates ......................... 710/315
6,064,626 A * 5/2000 Stevens ....................... 365/233
6,353,867 B1 * 3/2002 Qureshi et al. ............. 710/305
6,633,994 B1 * 10/2003 Hofmann et al. ........... 713/600

* cited by examiner

*Primary Examiner*—Thomas Lee
*Assistant Examiner*—Nirav Amin
(74) *Attorney, Agent, or Firm*—Aaron Waxler

(57) ABSTRACT

System (50), e.g. a System on a chip (SoC), comprising a system bus (56), a high-speed functional block (51) operably linked to the system bus (56), and a high-speed clock line (54) for applying a high-speed clock to the high-speed functional block (51). The system (50) further comprises a peripheral bus (59), a low-speed functional block (52) operably linked to this peripheral bus (59), a circuitry (53) for generating a wait signal (PWAIT), a low-speed clock line (57) for applying a low-speed clock (PCLK) to the low-speed functional block (52), a select line (58) for feeding a select signal (PSEL) from the peripheral bus (59) to the low-speed functional block (52), an enable line (55) for applying a clock enable signal (PCLKEN) to the circuitry (53), and a wait line (61) for feeding the wait signal (PWAIT) to the high-speed functional block (51). The circuitry (53) generates the wait signal (PWAIT) from the select line signal (PSEL) and the clock enable signal (PCLKEN).

14 Claims, 4 Drawing Sheets

EXTENSION FOR THE ADVANCED MICROCONTROLLER BUS ARCHITECTURE (AMBA)

FIELD OF THE INVENTION

The present invention concerns generally the interconnection and management of functional blocks of an Advanced Peripheral Bus (APB) with functional blocks in the domain of the Advanced High-performance system Bus (AHB) or the Advanced System Bus (ASB). In particular, the present invention concerns an extension of the AMBA-APB architecture that allows APB-peripherals to be connected to the functional blocks within the AHB or ASB domain.

BACKGROUND OF THE INVENTION

As the demand for more powerful and flexible computing devices increases, more and more Systems-on-Chip (SoC) are being developed. Many SoCs comprise Application Specific Integrated Circuits (ASICs) that are offered by several companies.

The Advanced RISC Machines (ARM) microprocessor is very popular for SoC solutions. Today it is fair to say that the ARM Embedded Technology is universally recognised as an industry standard for ASIC design for portable applications. Creating and applying powerful, portable and at the same time re-usable Intelligent Property (IP), capable of enhancing an ARM core is therefore of utmost importance to any ASIC design centre.

AMBA is an open standard, on-chip bus specification that details a strategy for the interconnection and management of functional blocks that makes up a SoC. AMBA defines a signal protocol for the connection of multiple blocks in a SoC. It facilitates the development of embedded processors (e.g., ARM microprocessors) with multiple peripherals. AMBA enhances a reusable design methodology by defining a common bus structure for SoC modules.

SoCs, and in particular ARM-based SoCs, are well suited for communication applications, including cable modems, xDSL, Voice-over-IP (VoIP) and Internet appliances, hand-held devices (e.g., Personal Digital Assistants), GSM and UMTS systems, digital video cameras, hand sets, and so forth. SoCs can also be used by the automotive industries., e.g. for handling tasks inside a car.

A typical AMBA-based SoC 10 consists of an AHB system bus 16 and peripheral bus 19, as illustrated in FIG. 1. An Advanced System Bus can be employed instead of the AHB. In many SoC implementations, an Advanced Peripheral Bus (APB) is employed as peripheral bus. The SoC 10 further comprises an ARM processor 11—such as a high-speed ARM7TDMI 32-Bit RISC Central Processing Unit (CPU)—an internal memory (e.g., a Random Access Memory) 12, an external memory interface 13, and a Direct Memory Access Unit (DMAU) 14. All these functional blocks are connected to the AHB 16. The peripheral bus 19 is connected via an APB bridge 15 to the AHB 16. In the present example, two peripherals (keyboard scanner 17 and UART 18) are connected to the peripheral bus 19. In known ARM-based SoC implementations, the functional blocks may be clocked by a common clock, e g., a HCLK clock in an AHB implementation and a BCLK clock in an ASB implementation. For this purpose, a clock line 20 is connected to the respective functional blocks, as illustrated in FIG. 1.

There are situations where it is necessary to drive the APB peripherals with a lower clock frequency than the functional blocks that are connected to the AHB or ASB bus. It is desirable, to provide for means that allow to reduce the power consumption of the SoC. There is no standardised solution to this problem. If somebody wants to run functional blocks in the APB domain at a lower clock speed than the AHB- or ASB domain's clock speed, and to reduce the power consumption, then a solution has to be developed from scratch. Since there is no standardised solution, the peripherals are not interchangeable.

A problem occurs if a functional block within the high clock frequency domain (i.e., within the AHB- or ASB-domain) transfers data to a functional block in the low clock frequency domain (e.g., within the APB domain). Since the functional block in the low clock frequency domain is not able to cope with the amount of data transmitted by the functional block in the high clock frequency domain, a congestion is likely to occur.

SUMMARY OF THE INVENTION

It is an object of the present invention to provide a scheme for enhancing AMBA by adding a reusable design methodology for driving APB functional blocks at a lower clock speed.

It is an object of the present invention to provide a scheme for enhancing AMBA by adding a reusable design methodology for reducing the power consumption of APB functional blocks.

It is an object of the present invention to provide a system and method that can be driven at a lower clock speed and that leads to a reduced power consumption.

These and other objectives are achieved by the present invention which provides a method for.

A system is provided that comprises a high-speed functional block operably linked to the system bus, a high-speed clock line for applying a high-speed clock to the high-speed functional block, a peripheral bus, a low-speed functional block operably linked to the peripheral bus, a circuitry for generating a wait signal, a low-speed clock line for applying a low-speed clock to the low-speed functional block, a select line for feeding a select signal from the peripheral bus to the low-speed functional block, an enable line for applying a clock enable signal to the circuitry, and a wait line for feeding the wait signal to the high-speed functional block. The circuitry generates the wait signal from the select line signal and the clock enable signal.

It is an advantage of the present scheme that functional blocks in an APB domain can be run at a lower clock speed than the AHB- or ASB domain's clock speed, and that the power consumption is reduced.

The present scheme is a standardized solution that allows peripherals to be interchanged more easily. The present invention provides an extension of the AMBA-APB specification Revision 2.0.

It is an advantage of the present invention that peripheral subsystems can be easily combined with an embedded ARM core. Custom ASICs can be realised more easily.

These and other aspects of the invention will be apparent from and elucidated with reference to the embodiment(s) described hereinafter.

BRIEF DESCRIPTION OF TEE DRAWINGS

For a more complete description of the present invention and for further objects and advantages thereof, reference is made to the following description, taken in conjunction with the accompanying drawings, in which.

ARM7TDMI and AMBA are trademarks of Advanced RISC Machines Ltd.

DESCRIPTION OF PREFERRED EMBODIMENTS

The present invention is described in connection with several embodiments.

The words connected, linked or coupled are herein used to describe a state where a first unit is connected to a second unit, when in use, such that the first unit can send information to the second unit and/or vice versa.

A peripheral is a functional block (software and/or hardware) that, for example, serves as an interface to another system, or component, or the outside world. Examples are: interfaces (e.g., a keyboard scanner or a display driver), storage units (e.g., Flash cards), communication interfaces (e.g., a modem), and so forth. A peripheral can also be an internal functional block, such as a co-processor, for example.

In the present description a distinction is made between high-speed and low-speed clocks. A high-speed clock is a signal with a high frequency. The low-speed clock has a frequency that is smaller than the frequency of the high-speed clock. Preferably, the frequency of the high-speed clock is in the range between 1 MHz and 500 MHz whereas the frequency of the low-speed clock is the range between a few kHz and a few MHz.

Figure 1:
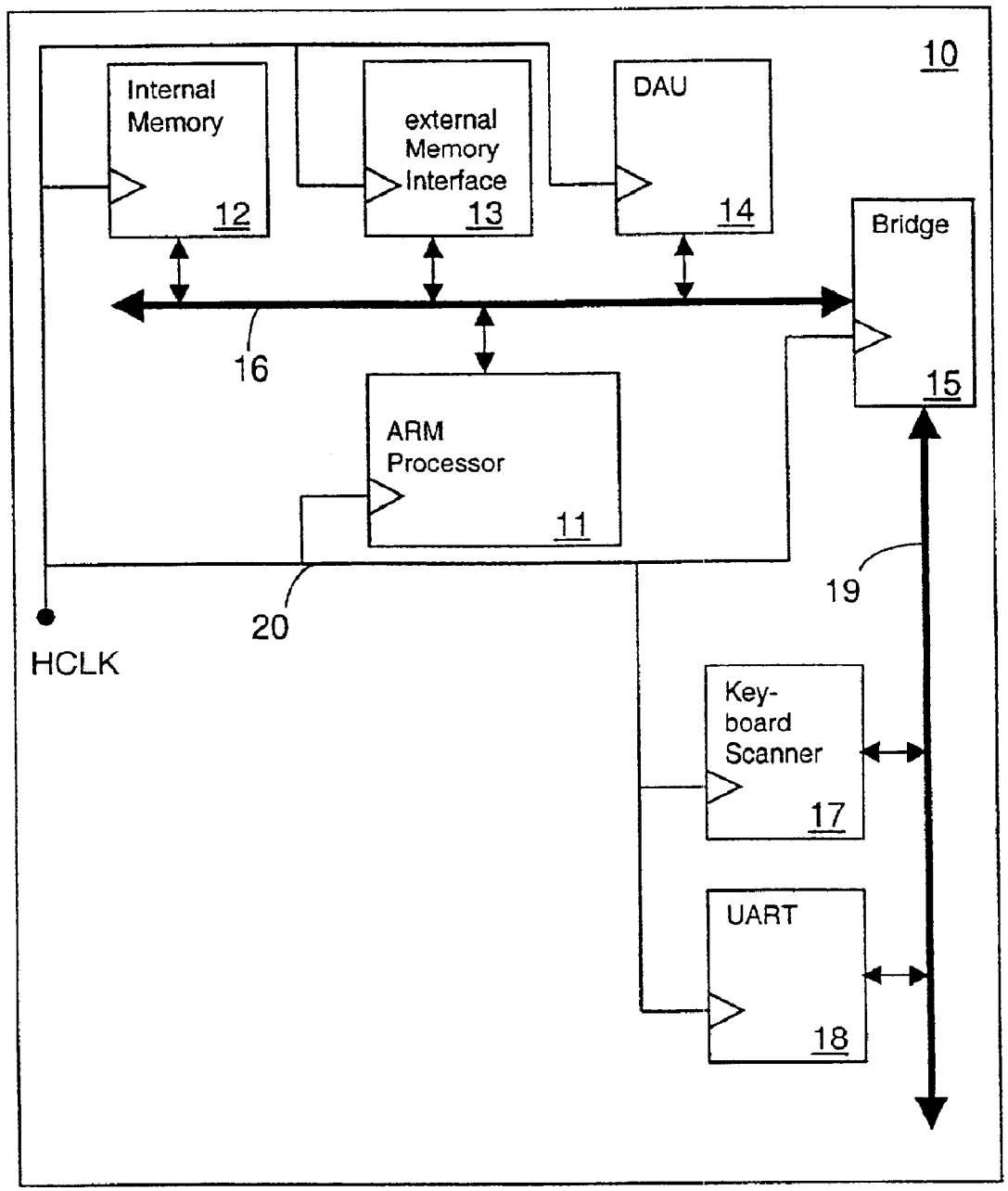
FIG. 1 is a schematic block diagram of an typical AMBA-based SoC.
Figure 2:
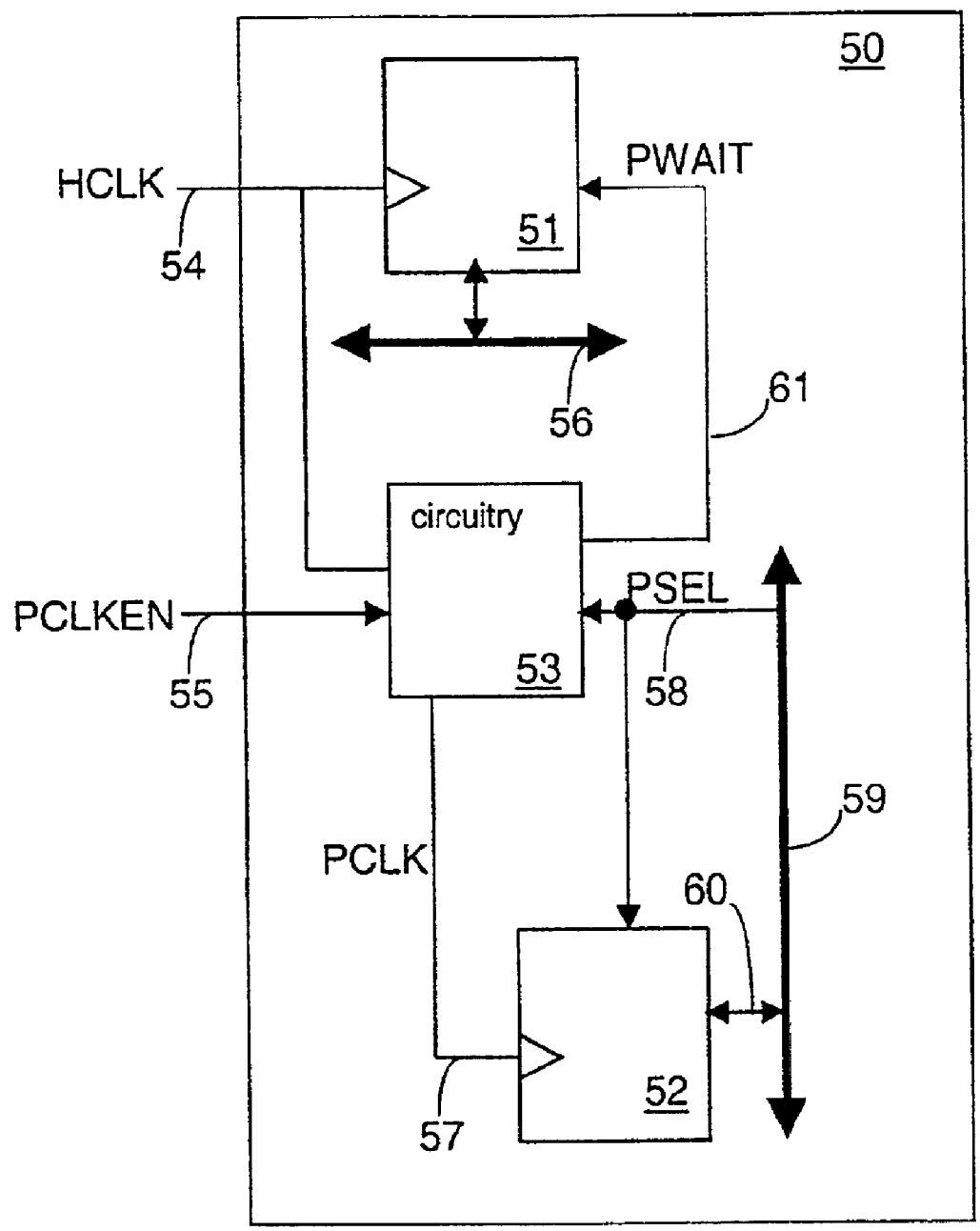
FIG. 2 is a schematic block diagram of part of a system, in accordance with a first embodiment of the present invention.

A first embodiment is described in connection with FIG. 2. A SoC 50 is illustrated in this Figure. It comprises a high-speed functional block 51 and a system bus 56 (high-speed bus). The high-speed functional block 51 receives a high-speed clock (HCLK) via a high-speed clock line 54.

In addition to the system bus 56, the system 50 also comprises a peripheral bus 59 (low-speed bus). In the present embodiment, a low-speed functional block 52 is connected to the bus 59, as indicated by the arrow 60. The functional block 52 can send information (e.g., data) to the peripheral bus 59 and it can receive information from the peripheral bus 59. According to the present invention, a circuitry 53 is provided. This circuitry 53 and the functional block 52 receive a select signal (PSEL) via the peripheral bus 59 and select line 58. This select signal (PSEL) is issued by a central address decoder (not shown in FIG. 2), for example. In the present example, the PSEL is assumed to be issued in order to select the low-speed functional block 52. The circuitry 53 is also coupled via the high-speed clock line 54 to the high-speed clock (HCLK). Additionally, a clock enable signal (PCLKEN) is applied via enable line 55 to the circuitry 53. This clock enable signal (PCLKEN) is a dynamic signal that may be generated by a state machine or by a control signal provided by a configuration register, for example.

The circuitry 53 combines the high-speed clock (HCLK) and the clock enable signal (PCLKEN) in order to generate a low-speed clock (PCLK). This low-speed clock (PCLK) is applied via a low-speed clock line 57 to the low-speed functional block 52. The circuitry 53 also generates a wait signal (PWAIT) which is—as illustrated in FIG. 2—fed via a wait signal line 61 to the high-speed functional block 51. The circuitry 53 combines the select signal (PSEL) and the clock enable signal (PCLKEN) in order to generate the wait signal (PWAIT).

The circuitry 53 serves as an interface for a conventional low-speed functional block 52. It allows to connect such a low-speed functional block 52 to the high-speed domain (e.g., the high-speed functional block 51).

A connection may be established between the system bus 56 and the peripheral bus 59 via a bridge (not shown in FIG. 2), or the like.

Figure 3:
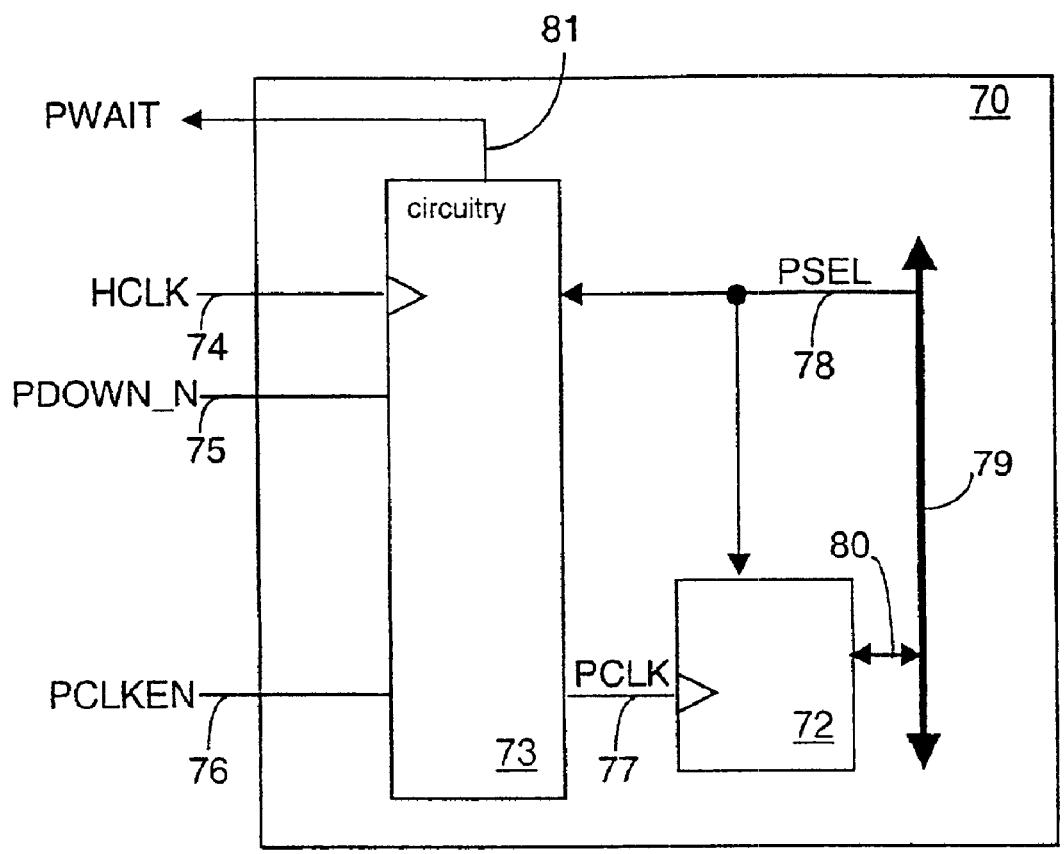
FIG. 3 is a schematic block diagram of part of a system, in accordance with a second embodiment of the present invention.

According to another embodiment of the present invention, an additional signal—herein referred to as power down signal (PDOWN_N)—is applied to the circuitry. This power down signal (PDOWN_N) is employed in order to be able to control the power consumption of the SoC 70, as illustrated in FIG. 3. The SoC 70 comprises a low-speed bus 79 (e.g., an APB peripheral bus), a low-speed functional block 72, and a circuitry 73. A high-speed clock HCLK is applied via the high-speed clock line 74 to the circuitry 73. The power down signal (PDOWN_N) is applied via a power down line 75, and the clock enable signal (PCLKEN) is applied via the clock enable line 76. The circuitry 73 and the functional block 72 receive a select signal (PSEL) via the low-speed bus 79 and the select line 78. A low-speed clock (PCLK) is fed by the circuitry 73 via a low-speed clock line 77 to the functional block 72. In the present example, the power down signal (PDOWN_N) is a low-active signal, as indicated by the "_N". This signal can be used to turn-off the low-speed functional block 72. This can be done during periods where this block 72 is not needed, for example. A power management scheme can be realised using this power down signal. A high-active signal can be used instead of the low-active signal. In this case, an additional inverter is necessary.

Figure 4:
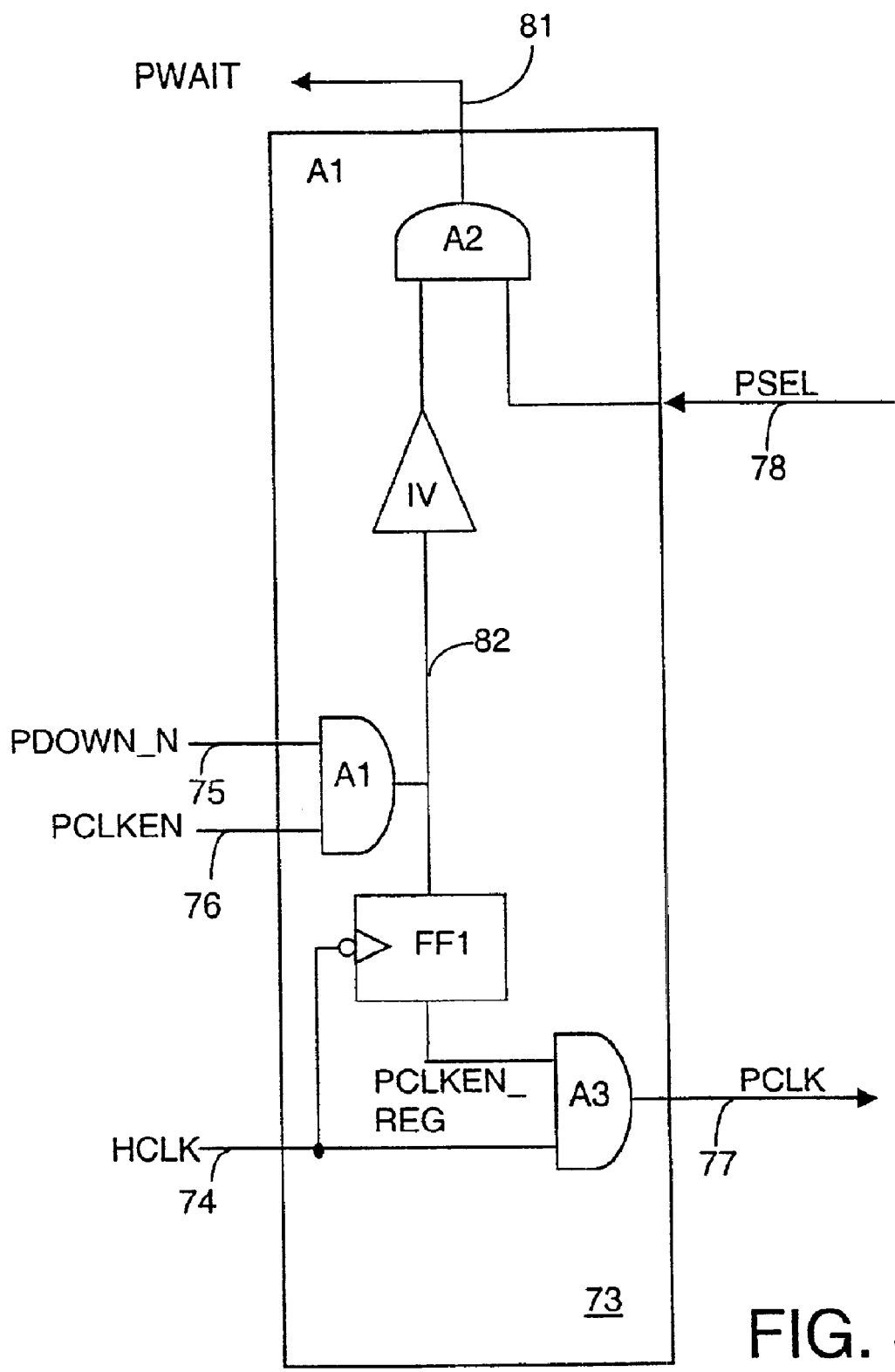
FIG. 4 is a schematic block diagram of the circuitry 73 of the second embodiment of the present invention.

An implementation example of the circuitry 73 is schematically illustrated in FIG. 4. In the present example, the circuitry 73 comprises three AND-gates (A1, A2, and A3), an inverter (IV), and a flip-flop (FF1). The power down signal (PDOWN_N) and the clock enable signal (PCLKEN) are applied to the AND-gate A1. The PWAIT signal is generated by inverting the output 82 of the AND-gate A1 and by feeding the output 82 and the PSEL signal to the AND-gate A2. The flip-flop FF1 is triggered by the high-speed clock (HCLK). It generates an output signal (PCLKEN_REG) that is applied to one input of the AND-gate A3. The high-speed clock (HCLK) is applied to the second input of the AND-gate A3. At the output side 77 of the AND-gate A3, the low-speed clock (PCLK) is provided. This low-speed clock (PCLK) is applied to the low-speed functional block 72.

The present invention is well suited for use in pervasive computing devices, such as PDAs, handheld computers, palm top computers, and so forth. It is also suited for being used in cellular phones (e.g., GSM phones), cordless phones (e.g., DECT phones), and so forth. The architecture proposed herein can be used in chips or chip sets for the above devices or in chips for Bluetooth applications.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable subcombination.

In the drawings and specification there have been set forth preferred embodiments of the invention and, although specific terms are used, the description thus given uses terminology in a generic and descriptive sense only and not for purposes of limitation.

What is claimed is:

1. System on a chip (SoC) comprising
    a system bus (56),
    a high-speed functional block (51) operably linked to the system bus (56),
    a high-speed clock line (54) For applying a high-speed clock to the high-speed functional block (51),
    a peripheral bus (59),
    a low-speed functional block (52) operably linked to the peripheral bus (59),
    a circuitry (53) for generating a wait signal (PWAIT),
    a low-speed clock line (57) for applying a low-speed clock (PCLK) to the low-speed functional block (52),
    a select line (58) for feeding a select signal (PSEL) from the peripheral bus (59) to the low-speed functional block (52),
    an enable line (55) for applying a clock enable signal (PCLKEN) to the circuitry (53),
    a wait line (61) for feeding the wait signal (PWAIT) to the high-speed functional block (51),
    wherein the circuitry (53) generates the wait signal (PWAIT) from the select line signal (PSEL) and the clock enable signal (PCLKEN).

2. The system of claim 1, wherein the circuitry (53) is connected to the high-Speed clock line (54), the enable line (55), and the select line (58).

3. The system of claim 1, wherein the circuitry (53; 73) combines the clock enable signal (PCLKEN) with a power down signal (PDOWN$_{13}$ N) and the select line signal (PSEL) in order to generate the wait signal (PWAIT).

4. The system of claim 3, wherein the power down signal (PDOWN$_{13}$ N) is applied via a power down line (75) to the circuitry (73).

5. The system of claim 1, wherein the circuitry comprises means for generating the low-speed clock (PCLK).

6. The system in accordance with claim 1, wherein the low-speed clock (PCLK) is generated from the high-speed clock and the clock-enable signal (PCLKEN).

7. The system of claim 1, wherein the circuitry is part of the low-speed functional block or wherein the circuitry is operably linked to the low-speed functional block.

8. The system of claim 1, wherein the circuitry comprises a plurality of logic gates.

9. The system of claim 1 further comprising a processor that is linked to the system bus.

10. The system of claim 1 further comprising a bridge for connecting the system bus to the peripheral bus, whereby the bridge allows an exchange of data between the high-speed functional block and the low-speed functional block.

11. The system of claim 1, wherein the system bus is a high-speed bus, preferably an AHB- or an ASB high bandwidth bus.

12. The system of claim 1, wherein the high-speed functional block is part of an AHB- or ASB domain.

13. The system of claim 1, wherein the peripheral bus is a low-speed bus, preferably a low bandwidth bus.

14. The system of claim 1, wherein the low-speed functional block is part of an APB domain.

* * * * *